UNITED STATES PATENT OFFICE.

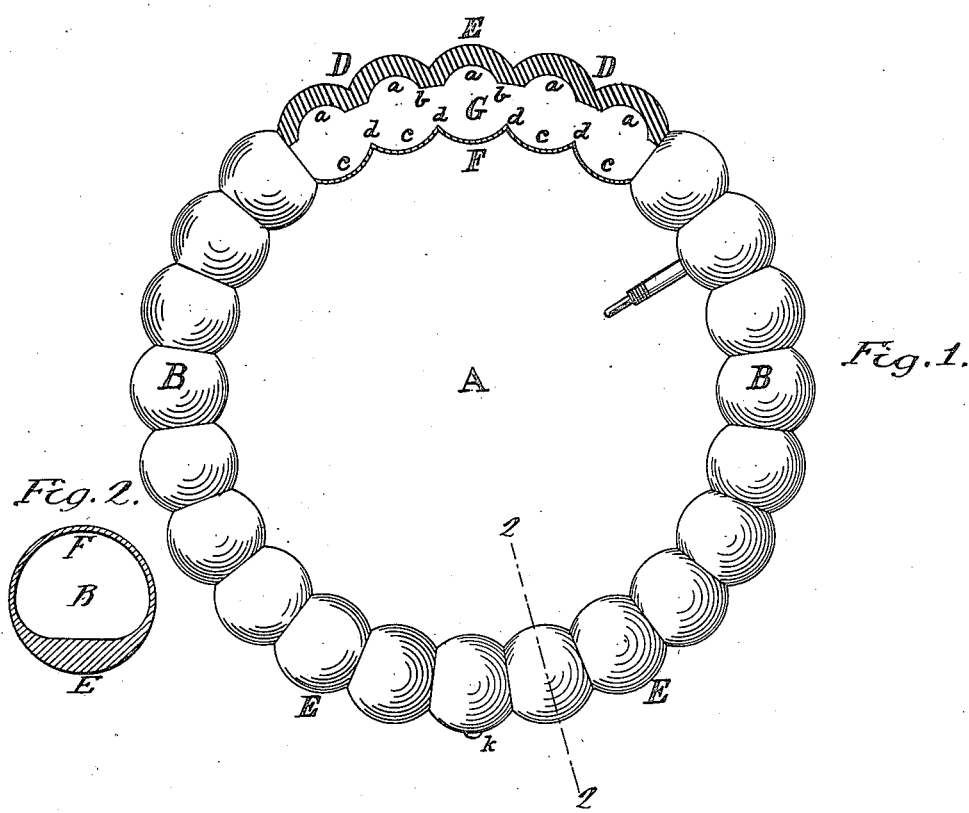

CHARLES BREWSTER STEELE, OF NEW YORK, N. Y.

TIRE.

1,151,133.     Specification of Letters Patent.     Patented Aug. 24, 1915.

Application filed February 19, 1907. Serial No. 358,330.

*To all whom it may concern:*

Be it known that I, CHARLES BREWSTER STEELE, a citizen of the United States, and resident of New York city and State of New York, have invented certain new and useful Improvements in Tires, of which the following is a specification.

My invention is a wheel tire, which consists, broadly, in having its outer configuration, substantially, in the form of integrally united spheres, the distance between the centers of which, is less than the sum of their radii. These spheres are, preferably, made hollow and intercommunicating, with the "tread" thicker than the side and wheel rim walls. These walls will vary in thickness according to the type of vehicle upon which they are to be used. For very heavy freight trucks the walls will be increased in thickness, so that the air space inside the tire will become very small, or become entirely eliminated, in proportion as the weight of the vehicle, and the load for which the tire is intended, increases. When the walls are made thin, it makes an excellent inner tube for a tire. The tire is made of rubber, or other suitable material, and when constructed and inflated for an inner-tube, or a single tube, tire, consists in form and contour, of a series of individual spheres, united one to the other, which constitutes, in reality, one continuous annular pneumatically inflated tube, divided into a series of air-chambers, or enlargements, the outer configuration of each chamber, or enlargement, forming, substantially, a sphere with a greater diameter than that of its inward boundary, which, collectively, form an annular air-chamber, and yet, preserves the individual resiliency of each individual hollow sphere. In proportion, as the thickness of the walls is increased, the liability of puncture decreases, and the ability to support additional weight is augmented. The peculiar configuration and construction of the spheres, or enlargements, renders the tire very resilient and flexible, and each sphere presenting almost its entire individual exterior to the atmosphere, and increasing the area of air contact, the heat generation so common to tires of other construction, is greatly diminished.

Figure 1, is an elevation of the tire, showing the upper portion in section. Fig. 2, is a section on line 2—2 of Fig. 1.

The letter A, represents the tire, which is formed of a plurality of enlargements, B, whose outward configurations are, substantially, that of spheres integrally united to each other. When the tire is intended to be used as an inner tube, or a single tube, for supporting lighter weight vehicles, the enlargements, B, are made hollow, providing intercommunicating air-chambers, which form an annular air-chamber, G, which may be pneumatically, or otherwise, inflated, the tire presenting an exterior appearance of a ring, or circle of united spheres, so constructively, and proportionally spaced, that only the traction surfaces of the spheres contact with the ground, the intervening recesses, C, and, D, made by the union of the sphere surfaces, forming an interior and exterior series of cushions, and so multiplying the shock centers, that the tire is more sensitive to vibrations at the points where the shock disturbance is the greatest, and when utilized as an inner-tube, the intervening exterior spaces, C, and, D, between the spheres, permit a circulation of air around the exterior surface of each sphere, and form a series of air-circulating chambers around, and between the outer surface of the inner-tube, and the inner surface of the outer-tube, or tire-cover, which greatly reduces the temperature of the air of the inflation tube, and prevents the "heating up" of the tire.

The traction walls, or treads E, of the spheres, B, are suitably thickened, to attain the maximum of wear and tear, and render the tire less liable to puncture. The sides and rim walls, F, of the spheres may be thinner than the treads, and being, each, counterpart in form, provide a similar additional series of exterior cushions, C, while the air chamber, G, has several series of interior cushions, *a b c d* all of which perform their individual functions, coöperatively, one with the other, and concertively, act with each other to distribute the traction weight and air pressure.

Practical experience demands that the ideal pneumatic tire must produce certain results, endure rough usage on uneven roads, possess the least liability to puncture, have great resiliency, and not become overheated. To accomplish this, I have so constructed my tire that when used as a single tube, or as an inner-tube, the traction periphery is made suitably thick to resist "puncture," the multiple series of exterior rim and traction cushions, providing the greatest range of springing activity, while the multiplicity of interior cushions, forming the annular air chamber, permit an infinite range of pneumatic displacement. Each sphere, and sub-air-chamber, acts, independently, as an individual shock absorber, superlatively sensitive to the slightest vibration, but, being an integral part, one in all, and all in one, of the continuous air-chamber, the cushion and pneumatic resiliency is so intensified, that any shock is received with minimum resistance, and so instantaneously cut into such a multiplicity of vibration waves, and so quickly and widely distributed, that the shock is dissipated before it reaches the vehicle, while the cubical contents and tire surface, is so largely increased and so opportunely presented to the atmosphere, that the heat, so commonly generated by friction, is greatly lessened, and the tire air-cooled by its own revolution.

The modification shown in Fig. 5, illustrates the spherical enlargements, B, provided with an integrally connecting and continuous annular tread, $g$, which may be flush with the outer diameter of each sphere, or raised therefrom, for the purpose of giving a wearing surface to the spheres, when used as a single tube tire.

Having described my invention, what I claim as new in this application for Letters Patent, is:—

1. A tire consisting of integrally united hollow spherical enlargements forming a continuous annular pneumatic tube.

2. A tire consisting of hollow spheres integrally connected the distance between their centers being less than the sum of their radii forming a continuous annular pneumatic tube.

3. A tire consisting of a plurality of enlargements whose exterior configuration forms an annular series of integrally united spheres.

4. A tire consisting of a series of hollow spheres united to each other, the distance between their centers being less than the sum of their radii, the thickness of the walls of the spheres on the outward boundary that form the tread of the tire, being greater than that on the inner boundary of the tire.

5. A tire consisting of a series of symmetrical enlargements united integrally with each other, the distance between the centers of the enlargements being less than the distance through the enlargements.

6. A tire consisting of symmetrical chambered enlargements, the walls of said enlargements forming the chamber being of varying thicknesses, each chamber being on communication with its contiguous chambers, and the walls of each chamber being united to its contiguous chamber integrally, the distance between the centers of the enlargements being less than the distance through the enlargements.

7. A tire consisting of integrally united spherical enlargements provided with integral projections between the enlargements, forming a continuous annular traction tread.

CHAS. BREWSTER STEELE.

Witnesses:
W. A. WHALEY,
C. M. FORREST.